(12) United States Patent
Liu

(10) Patent No.: US 11,597,286 B2
(45) Date of Patent: Mar. 7, 2023

(54) CHARGING APPARATUS FOR USE IN AN ELECTRIC VEHICLE CHARGING SYSTEM

(71) Applicant: ENTRUST SMART HOME MICROGRID LTD, Lancaster (GB)

(72) Inventor: Xiongwei Liu, Lancaster (GB)

(73) Assignee: ENTRUST SMART HOME MICROGRID LTD, Lancaster (GB)

( * ) Notice: Subject to any disclaimer, the term of this patent is extended or adjusted under 35 U.S.C. 154(b) by 0 days.

(21) Appl. No.: 17/274,765

(22) PCT Filed: Sep. 24, 2019

(86) PCT No.: PCT/GB2019/052694
§ 371 (c)(1),
(2) Date: Mar. 9, 2021

(87) PCT Pub. No.: WO2020/065301
PCT Pub. Date: Apr. 2, 2020

(65) Prior Publication Data
US 2022/0048396 A1 Feb. 17, 2022

(30) Foreign Application Priority Data
Sep. 24, 2018 (GB) ..................... 1815490

(51) Int. Cl.
*B60L 53/14* (2019.01)
*B60L 53/16* (2019.01)
(Continued)

(52) U.S. Cl.
CPC ............. *B60L 53/14* (2019.02); *B60L 53/16* (2019.02); *B60L 53/18* (2019.02); *H02J 7/02* (2013.01);
(Continued)

(58) Field of Classification Search
CPC ........ B60L 53/18; B60L 53/16; H02J 2310/48
(Continued)

(56) References Cited

U.S. PATENT DOCUMENTS 10,562,404 B1 * 2/2020 Khaligh .................. H02M 1/44
2014/0042967 A1 * 2/2014 Herzog .................... B60L 53/65
320/109
(Continued)

FOREIGN PATENT DOCUMENTS

CN 207719855 U 8/2018
EP 3333005 A1 * 6/2018 .......... B60L 11/1812
(Continued)

OTHER PUBLICATIONS

PCT International Search Report and Written Opinion; Application No. PCT/GB2019/052694, Entrust Smart Home Microgrid Ltd, International filing date of Sep. 24, 2019, dated Nov. 6, 2019, 14 pages.

*Primary Examiner* — Suresh Memula
(74) *Attorney, Agent, or Firm* — Patent Law Works LLP

(57) ABSTRACT

This specification describes a charging apparatus for use in an electric vehicle charging system which comprises an AC charging circuit connected to an AC power source, a DC charging circuit connected to a DC power source or the AC power source, the charging apparatus comprising: a first switch; a second switch; and a charging cable comprising a plurality of power lines, wherein each of the first switch and the second switch comprises a plurality of poles and a plurality of sets of contacts, wherein the plurality of poles corresponds to the plurality of power lines of the charging
(Continued)

cable, the first switch is configured to move the plurality of poles of the first switch between a first position wherein the plurality of power lines of the charging cable is connected to a first set of contacts of the first switch connected to the AC charging circuit, and a second position wherein the plurality of power lines of the charging cable is not connected to the first set of contacts of the first switch connected to the AC charging circuit, and the second switch is configured to move the plurality of poles of the second switch between a first position wherein the plurality of power lines of the charging cable is connected to a first set of contacts of the second switch, and a second position wherein the plurality of power lines of the charging cable is not connected to the first set of contacts of the second switch.

15 Claims, 6 Drawing Sheets

(51) Int. Cl.
    *B60L 53/18*         (2019.01)
    *H02J 7/02*          (2016.01)

(52) U.S. Cl.
    CPC ....... *H02J 2207/20* (2020.01); *H02J 2310/48* (2020.01)

(58) Field of Classification Search
    USPC .......................................................... 320/109
    See application file for complete search history.

(56) References Cited

U.S. PATENT DOCUMENTS

| | | | |
|---|---|---|---|
| 2016/0152153 A1* | 6/2016 | Yang | B60L 53/16 320/109 |
| 2018/0138730 A1* | 5/2018 | Fuchs | H02M 7/06 |
| 2018/0201142 A1* | 7/2018 | Galin | H02J 7/0042 |
| 2019/0036366 A1* | 1/2019 | Dohmeier | H02J 7/022 |
| 2020/0070672 A1* | 3/2020 | Vahedi | B60L 53/67 |
| 2020/0076217 A1* | 3/2020 | Filippi | B60L 3/00 |
| 2020/0122585 A1* | 4/2020 | Bhat | H01H 47/001 |
| 2021/0188106 A1* | 6/2021 | Asa | H02M 1/4216 |
| 2022/0024334 A1* | 1/2022 | Marczi | B60L 53/51 |

FOREIGN PATENT DOCUMENTS

| | | | | |
|---|---|---|---|---|
| EP | 3221917 B1 * | 2/2021 | | B60L 53/16 |
| EP | 3823131 A1 * | 5/2021 | | H02J 7/02 |
| JP | 2019134660 A * | 8/2019 | | |
| WO | WO-2013182825 A1 * | 12/2013 | | B60L 11/1811 |
| WO | 2014045778 A1 | 3/2014 | | |
| WO | WO-2014160488 A1 * | 10/2014 | | B60L 11/1803 |
| WO | WO-2019071331 A1 * | 4/2019 | | B60L 53/22 |
| WO | WO-2019071359 A1 * | 4/2019 | | B60L 53/11 |
| WO | 2020065301 A1 | 4/2020 | | |
| WO | WO-2020258939 A1 * | 12/2020 | | B60L 53/20 |
| WO | WO-2021081967 A1 * | 5/2021 | | |
| WO | WO-2021092658 A1 * | 5/2021 | | |
| WO | WO-2021148617 A1 * | 7/2021 | | |
| WO | WO-2021209532 A1 * | 10/2021 | | |

* cited by examiner

CHARGING APPARATUS FOR USE IN AN ELECTRIC VEHICLE CHARGING SYSTEM

CROSS-REFERENCE TO RELATED APPLICATIONS

This application is a national phase entry under 35 U.S.C. § 371 of International Patent Application PCT/GB2019/052694, filed Sep. 24, 2019, designating the United States of America and published in English as International Patent Publication WO2020/065301 on Apr. 2, 2020, which claims the benefit under Article 8 of the Patent Cooperation Treaty to United Kingdom Patent Application Serial No. 1815490.6, filed Sep. 24, 2018, the entireties of which are hereby incorporated by reference.

TECHNICAL FIELD

This specification relates to electric vehicles and electric vehicle charging systems.

BACKGROUND

Electric vehicles have been gaining momentum in recent years. Charging electric vehicle, or more accurately charging the batteries or battery packs of electric vehicle, is one of the key factors for the growth of electric vehicles on road.

An electric vehicle (EV), is generally equipped with a vehicle on-board charger and an AC (e.g. alternating current) charging inlet (e.g. socket) supplying the on-board charger AC power. In other words, the vehicle on-board charger takes in AC power through the vehicle on-board charging inlet and converts the AC power to DC power and charges the batteries of the electric vehicle. Some EV models are equipped with single-phase on-board charger. Other models have three-phase on-board charger, which may be configured to run as single-phase charger when the power supply is a single-phase AC power source.

An electric vehicle may be configured to take in controlled DC power charging the batteries of the electric vehicle through a DC charging inlet or a combined AC and DC charging inlet.

An electric vehicle charging system involves a vehicle on-board charging system including at least one vehicle on-board charging inlet and a vehicle on-board charger, at least one charging cable (e.g. connector) comprising a vehicle-end plug for conductive charging, at least one external EV charger (hereafter EV charger) or charging station and/or at least one power source, which may be an AC and/or DC power source, and communication between the vehicle on-board charging system and the external EV charger. For interchangeability, it is a general practice to establish standards for the electric vehicle charging systems, both DC and AC charging systems.

Currently there are at least three standards for DC charging in terms of communication, control and physical connection between the EV charger or charging station and the vehicle on-board charging system, namely CHAdeMO, GB/T and CCS. CHAdeMO is the Japanese standard for DC charging and has applications in Japan, Europe and America. GB/T is the Chinese standard for DC charging and is dominant in China. CCS, Combined Charging System, is a standard for electric vehicle charging system in Europe and America and has been gaining support from most electric vehicle manufacturers in Europe and America.

The CCS Combo 1 and CCS Combo 2 define the physical connection standards between the vehicle on-board charging inlet and the vehicle-end plug of the charging cable.

The three standards (e.g. CHAdeMO, GB/T and CCS) use different communication, control and physical connections between vehicle on-board charging inlet and charging plug, and which create huge problems and cost the industry billions of dollars each year. Today many EV chargers or charging stations in Europe and America have two or three connectors of different standards, one CHAdeMO and one CCS Combo 1 or Combo 2 for DC charging, and one Type 1 or Type 2 for AC charging.

If one standard can be agreed globally, things will be much simpler. However, it is unlikely this will happen in the near future and the three (or more) standards will co-exist for a while. Therefore, there is a need to develop an electric vehicle charging system with a single vehicle on-board charging inlet, and a single charging socket and/or charging cable which may be used for most or all electric vehicles in Europe and America, and worldwide.

SUMMARY

In a first aspect, this specification describes charging apparatus for use in an electric vehicle charging system which comprises an AC charging circuit connected to an AC power source, a DC charging circuit connected to a DC power source or the AC power source, the charging apparatus comprising a first switch, a second switch, and a charging cable comprising a plurality of power lines, wherein each of the first switch and the second switch comprises a plurality of poles and a plurality of sets of contacts, wherein the plurality of poles corresponds to the plurality of power lines of the charging cable, the first switch is configured to move the plurality of poles of the first switch between a first position wherein the plurality of power lines of the charging cable is connected to a first set of contacts of the first switch connected to the AC charging circuit, and a second position wherein the plurality of power lines of the charging cable is not connected to the first set of contacts of the first switch connected to the AC charging circuit, and the second switch is configured to move the plurality of poles of the second switch between a first position wherein the plurality of power lines of the charging cable is connected to a first set of contacts of the second switch, and a second position wherein the plurality of power lines of the charging cable is not connected to the first set of contacts of the second switch.

The charging apparatus may further comprise a control apparatus configured to control the operation of the electric vehicle charging system.

The charging apparatus may further comprise a charging socket comprising a plurality of terminals, and wherein the plurality of terminals of the charging socket may be configured to connect to the plurality of poles of the first switch, and the charging cable may further comprise a charger-end plug comprising a plurality of terminals, wherein the plurality of terminals of the charger-end plug corresponds to the plurality of power lines of the charging cable, and the charger-end plug of the charging cable may be configured to plug into the charging socket.

When each of the first switch and the second switch are in the second position, the plurality of power lines of the charging cable may be connected to a second set of contacts of the first switch connected to the DC charging circuit, and the plurality of power lines of the charging cable may be connected to a second set of contacts of the second switch.

The charging apparatus may further comprise a vehicle on-board charging inlet comprising a plurality of terminals, and wherein the plurality of terminals of the vehicle on-board charging inlet may be configured to connect to the plurality of poles of the second switch, the first set of contacts of the second switch may be configured to connect to the vehicle on-board charger, the second set of contacts of the second switch may be configured to connect to the batteries of the electrical vehicle, and the charging cable may further comprise a vehicle-end plug comprising a plurality of terminals, wherein the plurality of terminals of the vehicle-end plug corresponds to the plurality of power lines of the charging cable, and the vehicle-end plug of the charging cable may be configured to plug into the vehicle on-board charging inlet.

The charging apparatus may further comprise a charging socket comprising a plurality of AC terminals and a pair of DC terminals, and wherein the first set of contacts of the second switch may configured to connect to the plurality of AC terminals of the charging socket, and the second set of contacts of the second switch may be configured to connect to the pair of DC terminals of the charging socket.

The charging cable may further comprise a vehicle-end plug, wherein the vehicle-end plug may comprise a plurality of AC terminals and a pair of DC terminals, the first set of contacts of the second switch may be configured to connect to the plurality of AC terminals of the vehicle-end plug of the charging cable, and the second set of contacts of the second switch may be configured to connect to the pair of DC terminals of the vehicle-end plug of the charging cable.

The charging apparatus may further comprise a charging socket comprising a plurality of AC terminals, a third switch and a charging connector comprising a plurality of AC power lines and a pair of DC power lines and a vehicle-end plug, wherein the vehicle-end plug may comprise a plurality of AC terminals corresponding to the plurality of AC power lines and a pair of DC terminals corresponding to the pair of DC power lines, and wherein the first set of contacts of the second switch may be configured to connect to the plurality of AC terminals of the charging socket, the third switch may comprise a plurality of poles and a plurality of sets of contacts, wherein the plurality of poles may be configured to connect to the second set of contacts of the second switch, and the third switch may be configured to move the plurality of poles of the third switch between a first position wherein the plurality of AC power lines of the charging connector may be connected to a first set of contacts of the third switch, and a second position wherein the plurality of AC power lines of the charging connector may be not connected to the first set of contacts of the third switch.

In the second position, the pair of DC power lines of the charging connector may be connected to a second set of contacts of the third switch.

At least two of the contacts of the second set of contacts of at least one of the switches may be electrically connected to one another and also to one of a DC positive terminal or a DC negative terminal.

At least one of the switches may be configured as a four-pole switch wherein each set of contacts may comprise four contacts, and at least one of the plurality of terminals may comprise four terminals.

At least one of the switches may be configured as a two-pole switch wherein each set of contacts may comprise two contacts, and at least one of the plurality of terminals may comprise two terminals.

At least one of the switches may further comprise a third set of contacts, the third set of contacts being isolated, and the at least one switch may be further configured to move the plurality of poles of the respective switch to a third position wherein the plurality of terminals may be connected to the third set of contacts.

The charging apparatus may further comprise a cap configured to cover the charging socket, a pocket configured to house the vehicle-end plug of the charging connector and an interlock mechanism, wherein the interlock mechanism may be configured to interlock the cap and the pocket to prevent the cap from being opened and the vehicle-end plug from being taken away from the pocket at the same time.

In a second aspect, this specification describes a method of controlling a charging apparatus for use in an electric vehicle charging system which comprises an AC charging circuit connected to an AC power source, a DC charging circuit connected to a DC power source or the AC power source, and a vehicle on-board charger connected to the batteries of the electric vehicle, the charging apparatus comprising a charging cable which comprises a plurality of power lines, a first switch and a second switch, and each of the two switches comprises a plurality of poles corresponding to the plurality of power lines of the charging cable, and a plurality of sets of contacts, the first switch is configured to selectively connect the plurality of power lines of the charging cable to one of: the AC charging circuit, and the DC charging circuit, and the second switch is configured to selectively connect the plurality of power lines of the charging cable to one of: a first set of contacts of the second switch, and a second set of contacts of the second switch, the method comprising determining whether to provide an AC charging operation or a DC charging operation, controlling the first switch to connect the plurality of power lines of the charging cable to the AC charging circuit, and the second switch to connect the plurality of power lines of the charging cable to the first set of contacts of the second switch or the second set of contacts of the second switch in response to determining that an AC charging operation should be provided, and controlling the first switch to connect the plurality of power lines of the charging cable to the DC charging circuit, and the second switch to connect the plurality of power lines of the charging cable to the second set of contacts of the second switch in response to determining that a DC charging operation should be provided.

The method may further comprise controlling the first switch and the second switch to connect the vehicle on-board charger to the AC charging circuit in response to determining that an AC charging operation should be provided, and controlling the first switch and the second switch to connect the batteries of the electrical vehicle to the DC charging circuit in response to determining that a DC charging operation should be provided.

The method may further comprise controlling the first switch and the second switch to connect the plurality of AC terminals of the charging socket or the vehicle-end plug of the charging cable to the AC charging circuit in response to determining that an AC charging operation should be provided, and controlling the first switch and the second switch to connect the pair of DC terminals of the charging socket or the vehicle-end plug of the charging cable to the DC charging circuit in response to determining that a DC charging operation should be provided.

The method may further comprise determining whether to provide an AC charging operation through the plurality of AC terminals of the charging socket or the plurality of AC terminals of the vehicle-end plug, or a DC charging operation through the pair of DC terminals of the vehicle-end plug, controlling the first switch and the second switch to connect the plurality of AC terminals of the charging socket to the AC charging circuit in response to determining that an AC charging operation should be provided through the plurality of AC terminals of the charging socket, controlling the first switch, the second switch and the third switch to connect the plurality of AC terminals of the vehicle-end plug to the AC charging circuit in response to determining that an AC charging operation should be provided through the plurality of AC terminals of the vehicle-end plug, and controlling the first switch, the second switch and the third switch to connect the pair of DC terminals of the vehicle-end plug to the DC charging circuit in response to determining that a DC charging operation should be provided through the pair of DC terminals of the vehicle-end plug.

In a third aspect, this specification describes an apparatus configured to perform the method according to the second aspect.

BRIEF DESCRIPTION OF DRAWINGS

For a more complete understanding of the charging apparatus described herein, reference is made now to the accompanying drawings, in which.

DETAILED DESCRIPTION

Figure 1A:
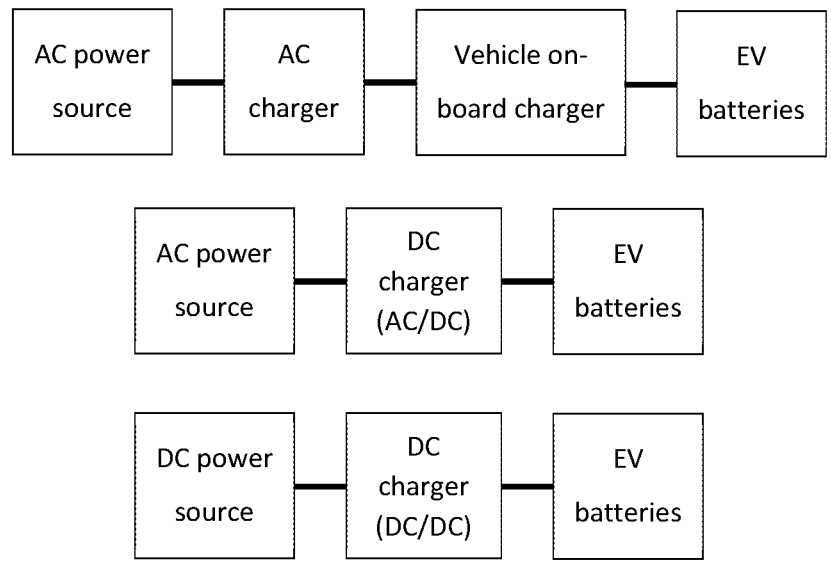
FIG. 1A illustrates examples of electric vehicle charging system.

In the description and drawings, like reference numerals may refer to like elements throughout.

An electric vehicle charging system may comprise an AC charger and a DC charger, which may form an EV charger or charging station, and a vehicle on-board charging system, which may include a vehicle on-board charging inlet, a vehicle on-board charger and batteries of the electric vehicle. The AC charger may comprise an AC charging circuit, the DC charger may comprise a DC charging circuit, and the vehicle on-board charger may comprise a DC charger.

FIG. 1A illustrates examples of electric vehicle charging system.

As illustrated in FIG. 1A, an AC charger may be configured to connect to an AC power source, and a DC charger may be configured to connect to an AC power source or a DC power source depending on the type of the DC charging circuit. When the DC charging circuit is an AC/DC converter (e.g. rectifier), the DC charging circuit may be configured to connect to an AC power source. When the DC charging circuit is a DC/DC converter, the DC charging circuit may be configured to connect to a DC power source.

An AC power source may be a single-phase AC power source or a three-phase AC power source. A single-phase AC power source may be supplied through a live cable/terminal and a neutral cable/terminal for a single-phase AC charging circuit. A three-phase AC power source may be supplied through a Y connection with four cables/terminals (e.g. three live cables/terminals L1, L2 and L3, and one neutral cable/terminal N) or A (e.g. delta) connection with three live cables/terminals for a three-phase AC charging circuit.

We use Y connection as an example representing three-phase AC power in this specification, but it will be appreciated that this type of connection is not limited as such. For instance, A connection may also be used.

A DC power source may be, for example, a battery storage and/or an array of solar PV panels, but not limited as such.

Figure 1B:
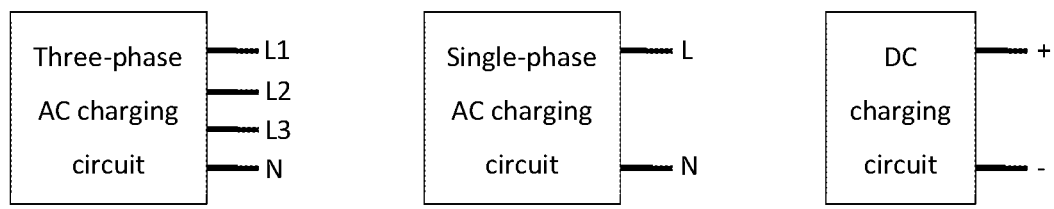
FIG. 1B illustrates examples of AC and DC charging circuits.

FIG. 1B illustrates examples of AC and DC chargers.

As illustrated in FIG. 1B, an AC charger may be, for example, a three-phase AC charging circuit comprising four terminals (L1, L2, L3 and N), or a single-phase AC charging circuit comprising a pair of terminals (L and N), but the types of AC charging circuits which may be used are not limited as such. A DC charger may comprise a pair of DC terminals (+ and −).

There are several standards for vehicle on-board charging inlet and corresponding vehicle-end plug of charging cable (or connector), associated charging socket of charging station and corresponding charger-end plug of charging cable, for example, Type 1, Type 2, CCS (Combined Charging System) Combo 1 and CCS Combo 2, but not limited as such.

Type 1 and Type 2 specify the standards for structures of vehicle on-board charging inlet, charging socket and plug for AC charging. CCS Combo 1 and CCS Combo 2 specify the standards for structure of vehicle on-board charging inlet for both DC and AC charging and plug for DC charging. Type 1 vehicle on-board charging inlet is integrated in CCS Combo 1 vehicle on-board charging inlet and Type 2 vehicle on-board charging inlet is integrated in CCS Combo 2 vehicle on-board charging inlet. In other words, a CCS Combo 1 vehicle on-board charging inlet includes a Type 1 vehicle on-board charging inlet, and a CCS Combo 2 vehicle on-board charging inlet includes a Type 2 vehicle on-board charging inlet.

A vehicle on-board charging inlet or charging socket or plug may comprise a plurality of terminals for power transfer and a plurality of terminals for communication and control and a protective earthing terminal.

For example, a Type 1 inlet or socket or plug comprises a pair of AC terminals (L and N) for single-phase AC charging, a Type 2 inlet or socket or plug comprises four AC terminals (L1, L2, L3 and N) for three-phase AC charging, or a pair of AC terminals (L1 and N) for single-phase AC charging. A CCS Combo 1 inlet or plug comprises a pair of DC terminals (+ and −) for DC charging, and a pair of AC terminals (L and N) for single-phase AC charging. A CCS Combo 2 inlet comprises a pair of DC terminals (+ and −) for DC charging, and four AC terminals (L1, L2, L3 and N) for three-phase AC charging or a pair of AC terminals (L1 and N) for single-phase AC charging.

A vehicle on-board charging inlet or charging socket or plug of Type 1 or Type 2 or CCS Combo 1 or CCS Combo 2 standard comprises one protective earthing terminal labelled "PE" (e.g. Protective Earth) for full-current protective earthing system.

A vehicle on-board charging inlet or charging socket or plug may comprise a plurality of terminals for communication and control, for example, two terminals in Type 1 or Type 2 or CCS Combo 1 or CCS Combo 2 standard labelled "PP" (e.g. Proximity Pilot) for pre-insertion signalling and "CP" (e.g. Control Pilot) for post-insertion signalling, but not limited as such. A vehicle on-board charging inlet or charging socket or plug of other standards, for example, Japanese standard CHAdeMO and Chinese standard GB/T, but are not limited as such, may comprise different terminals for communication and control.

Type 1 and CCS Combo 1 are used largely in America and are based on the same principle of Type 2 and CCS Combo 2, which are used largely in Europe, however configured differently. The other difference is that Type 1 and CCS Combo 1 are configured for single-phase AC charging only when they are used for AC charging, however Type 2 and CCS Combo 2 are configured for both single-phase and three-phase AC charging when they are used for AC charging.

An electric vehicle of non-CCS standard may comprise a Type 1 or Type 2 vehicle on-board charging inlet for AC charging. For example, an electric vehicle, such as Nissan Leaf, may have a CHAdeMO inlet, which is the Japanese standard, for DC charging, and a Type 2 vehicle on-board charging inlet for AC charging.

An electric vehicle of CCS Standard with CCS Combo 1 or CCS Combo 2 inlet may be charged through a DC charger with a CCS Combo 1 or CCS Combo 2 connector (e.g. plug) for DC charging and AC charging or an AC charger with a Type 1 or Type 2 connector for AC charging. The DC charger of CCS Standard cannot be used for charging electric vehicles of Japanese standard CHAdeMO or Chinese standard GB/T.

There are at least three alternative ways to overcome the above problem. One way is to add a second tethered (e.g. fixed) charging cable with CHAdeMO connector to charge electric vehicles of Japanese standard. However, the cost of the EV charger may be very high because the two different standards use different communication and control methods.

A second way is to add a single-phase AC socket to the DC charger for AC charging electric vehicles of Japanese standard. However, the single-phase AC socket allows only slow charging (e.g. 10A or 16A at 230V) and the electric vehicles of Japanese standard do not benefit from the DC charger.

A third way is to add an AC charger and a Type 2 or Type 1 inlet to the DC charger for AC charging electric vehicles of Japanese standard, and the AC charger may allow fast charging, for example, 7 kW single-phase or 22 kW three-phase AC charging power, depending on the vehicle on-board charger, but not limited as such. However, this method adds significant extra costs to the EV charger.

This specification will hereinafter describe charging apparatus for use in an electric vehicle charging system, for instance, those described in relation to FIG. 1A, which addresses the problems described above.

Figure 2A:
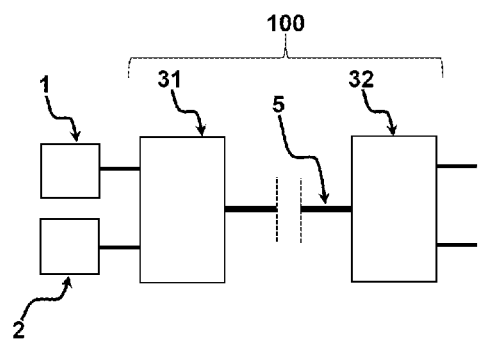
FIGS. 2A and 2B illustrate examples of charging apparatus which may be used in the electric vehicle charging system of FIG. 1A.
Figure 2B:
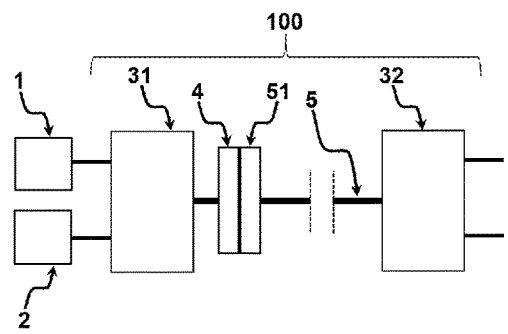

FIGS. 2A and 2B illustrate examples of charging apparatus for use in an electric vehicle charging system of FIG. 1A.

FIG. 2A illustrates a charging apparatus 100 comprising a first switch 31, a charging cable 5, and a second switch 32.

The first switch 31 and/or the second switch 32 in FIG. 2A may comprise a plurality of poles, for example four or two poles but not limited as such, corresponding to a plurality of terminals, and a plurality of sets of contacts, for example two or three sets of contacts but not limited as such, each set of contacts may correspond to a plurality of terminals, for example four or two terminals but not limited as such, as illustrated in FIGS. 4A to 4E.

The charging cable 5 may comprise a plurality of power lines, for example four or two power lines but not limited as such, for AC or DC power transfer.

The charging apparatus 100 may comprise a control apparatus, which may comprise a controller or controllers associated to different parts of the charging apparatus and/or the electric vehicle charging system, and may be configured to control the operation of the charging apparatus and/or the electric vehicle charging system.

As illustrated in FIG. 2A, each of the switches 31 and 32 may comprise a plurality of poles and two sets of contacts corresponding to two sets of terminals. The plurality of poles of the first switch 31 and the plurality of poles of the second switch 32 may be configured to connect to the plurality of power lines of the charging cable 5. In some embodiments, the first switch 31 and the second switch 32 may be configured to be in a back-to-back form. The first set of contacts of the first switch 31 may be configured to connect to an AC charging circuit 1, which may be configured to connect to an AC power source (not shown), and the second set of contacts of the first switch 31 may be configured to connect to a DC charging circuit 2, which may be configured to connect to the AC power source or a DC power source (not shown) depending on the type of the DC charging circuit 2.

As illustrated in FIG. 2A, the first switch 31 may be configured to switch the connections between the AC charging circuit 1 and the DC charging circuit 2 to the charging cable 5. The second switch 32 may be configured to switch the connection between its two sets of terminals to the charging cable 5. The first switch 31 and the second switch 32 may be configured to switch the connections between the AC charging circuit 1 to the first set of terminals of the second switch 32 and the DC charging circuit 2 to the second set of terminals of the second switch 32, or between the AC charging circuit 1 to the second set of terminals of the second switch 32 and the DC charging circuit 2 to the first set of terminals of the second switch 32.

It will be appreciated that the first switch 31 and the second switch 32 may be configured to form an interlock switch to switch the connections between the AC charging circuit 1 to the first set of terminals of the second switch 32 and the DC charging circuit 2 to the second set of terminals of the second switch 32, or between the AC charging circuit 1 to the second set of terminals of the second switch 32 and the DC charging circuit 2 to the first set of terminals of the second switch 32.

The charging apparatus 100 in FIG. 2A may be configured to transfer AC power from the AC charging circuit 1 to a vehicle on-board charger (not shown) of an electric vehicle (not shown) in a controlled manner when the vehicle on-board charger of the electric vehicle is connected to one of the two sets of terminals of the second switch 32.

The DC charging circuit 2 may be a DC/DC converter taking power from a DC power source (not shown), for example, a battery storage and/or an array of solar PV panels, but not limited as such, or an AC/DC converter (e.g. rectifier) connected to an AC power source (not shown). The DC charging circuit 2 may be configured to convert the AC or DC power source to a controlled DC power output for charging the batteries (not shown) of an electric vehicle when the electric vehicle is connected to one of the two sets of terminals of the second switch 32.

FIG. 2B illustrates a variation of the charging apparatus 100 of FIG. 2A, the plurality of power lines of the charging cable 5 may be connected to the plurality of poles of the first switch 31 through a paired charging socket and plug.

As illustrated in FIG. 2B, the charging apparatus 100 may further comprise a charging socket 4, and the charging cable 5 may further comprise a charger-end plug 51. The charging socket 4 may comprise a plurality of terminals, which may be configured to connect to the plurality of poles of the first switch 31. The charger-end plug 51 of the charging cable 5 may comprise a plurality of terminals corresponding to the plurality of power lines of the charging cable 5. The charger-end plug 51 may be configured to plug into the charging socket 4 so that the plurality of power lines of the charging cable 5 may be configured to connect to the plurality of poles of the first switch 31.

It will be appreciated that the connections between the plurality of power lines of the charging cable 5 and the plurality of poles of the first switch 31 are the same in the two examples in FIGS. 2A and 2B.

It will be appreciated that the charging cable 5 in FIGS. 2A and 2B may further comprise a plurality of communication and control signal lines, for example "PP" and "CP" lines but not limited as such. Therefore, the charger-end plug 51 of the charging cable 5 (as in FIG. 2B) may further comprise a plurality of communication and control signal terminals corresponding to the plurality of communication and control signal lines of the charging cable 5. Likewise, the plurality of terminals of the charging socket 4 may further comprise a plurality of communication and control signal terminals corresponding to the plurality of communication and control signal terminals of the charger-end plug 51. However, the plurality of communication and control signal lines and corresponding terminals of the charger-end plug 51 and the charging socket 4 may not be configured to connect to the first switch 31 and the second switch 32. The plurality of communication and control signal lines/terminals are not configured to connect to any of the switches in the specification and may be configured to connect to the control apparatus and/or the controller(s).

FIGS. 3A to 3D illustrate application examples of the charging apparatus 100 of FIGS. 2A and 2B for use in an electric vehicle charging system of FIG. 1A.

Figure 3A:
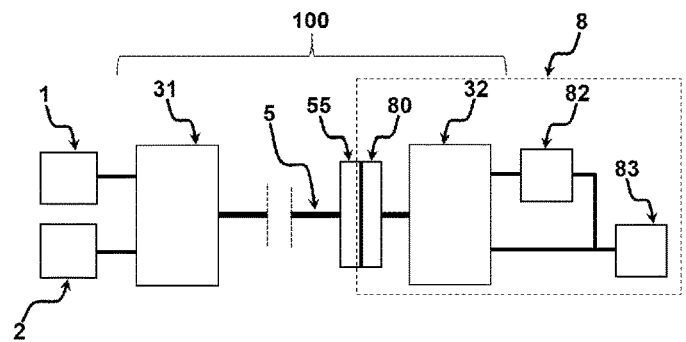
FIGS. 3A to 3D illustrate application examples of charging apparatus of FIGS. 2A and 2B.

FIG. 3A illustrates an example of the charging apparatus 100 of FIGS. 2A and 2B for use in an electric vehicle charging system of FIG. 1A, and the charging apparatus 100 involves a vehicle on-board charging system.

As illustrated in FIG. 3A, based on the charging apparatus 100 of FIGS. 2A and 2B, the plurality of power lines of the charging cable 5 may be connected to the plurality of poles of the second switch 32 through a paired vehicle on-board charging inlet and plug.

As illustrated in FIG. 3A, the charging apparatus 100, which is based on the charging apparatus 100 of FIGS. 2A and 2B, may further comprise a vehicle on-board charging inlet 80, the charging cable 5 may further comprise a vehicle-end plug 55, and the vehicle-end plug 55 may be configured to plug into the vehicle on-board charging inlet 80 so that the plurality of power lines of the charging cable 5 may be connected to the plurality of poles of the second switch 32.

It will be appreciated that the connections between the plurality of power lines of the charging cable 5 and the plurality of poles of the second switch 32 are the same in the three examples as illustrated in FIGS. 2A, 2B and 3A.

The vehicle on-board charging inlet 80 may comprise a plurality of terminals, which may be configured to connect to the plurality of poles of the second switch 32. The vehicle-end plug 55 may comprise a plurality of terminals corresponding to the plurality of power lines of the charging cable 5.

As illustrated in FIG. 3A, the first set of contacts of the second switch 32 may be configured to connect to the vehicle on-board charger 82 of the electric vehicle, and the second set of contacts of the second switch 32 may be configured to connect to the batteries 83 of the electric vehicle.

It will be appreciated that the paired charging socket 4 and plug 51 (as in FIG. 2B) and the paired vehicle on-board charging inlet 80 and charger-end plug 55 (as in FIG. 3A) may be ignored for the description of the operation of the charging apparatus 100 or the electric vehicle charging system in FIG. 3A.

The charging apparatus 100 of FIG. 3A may be used for AC and DC charging any electric vehicle through a single vehicle on-board charging inlet 80 and a single charging cable 5. For example, when the AC charging circuit 1 is a three-phase AC circuit comprising four AC terminals (L1, L2, L3 and N), the DC charging circuit 2 may comprise a pair of DC terminals (+ and −), the charging cable 5 may comprise four power lines, the vehicle on-board charger 82 may be a three-phase AC charger comprising four AC terminals (L1, L2, L3 and N), each of the switches 31 and 32 may comprise four poles corresponding to four terminals connected to the four power lines of the charging cable 5, the first set of contacts of the first switch 31 may comprise four contacts corresponding to four terminals connected to the AC terminals (L1, L2, L3 and N) of the AC charging circuit 1, the second set of contacts of the first switch 31 may comprise two contacts corresponding to two terminals (as in FIG. 4A) connected to the pair of DC terminals (+ and −) of the DC charging circuit 2, the first set of contacts of the second switch 32 may comprise four contacts corresponding to four terminals connected to the four AC terminals (L1, L2, L3 and N) of the vehicle on-board charger 82, and the second set of contacts of the second switch 32 may comprise two contacts corresponding to two terminals (as in FIG. 4A) connected to the pair of DC terminals (+ and −) of the batteries 83 of the electric vehicle. The charging apparatus 100 may be configured to charge the batteries 83 of the electric vehicle through the three-phase AC charging circuit 1 or the DC charging circuit 2 by controlling switching the switches 31 and 32.

Likewise, when the AC charging circuit 1 is a single-phase AC charger comprising two AC terminals (L and N), the charging cable 5 may comprise two power lines, the vehicle on-board charger 82 may be a single-phase AC charger comprising two AC terminals (L and N), each of the switches 31 and 32 may comprise two poles corresponding to two terminals connected to the two power lines of the charging cable 5, the first set of contacts of the first switch 31 may comprise two contacts corresponding to two terminals connected to the AC terminals (L and N) of the AC charging circuit 1, the second set of contacts of the first switch 31 may comprise two contacts corresponding to two terminals (as in FIG. 4D) connected to the pair of DC terminals (+ and −) of the DC charging circuit 2, the first set of contacts of the second switch 32 may comprise two contacts corresponding to two terminals connected to the AC terminals (L and N) of the vehicle on-board charger 82, and the second set of contacts of the second switch 32 may comprise two contacts corresponding to two terminals (as in FIG. 4D) connected to the pair of DC terminals (+ and −) of the batteries 83 of the electric vehicle. The charging apparatus 100 may be configured to charge the batteries 83 of the electric vehicle through the single-phase AC charging circuit 1 or the DC charging circuit 2 by controlling switching the switches 31 and 32.

It will be appreciated that the vehicle on-board charger 82 may be a single-phase AC charger or a three-phase AC charger in the above two examples regardless of whether the AC charging circuit 1 is a single-phase AC charger or a three-phase AC charger. However only when both the AC charging circuit 1 and the vehicle on-board charger 82 are three-phase AC chargers, three-phase AC charging the batteries 83 of the electric vehicle may be configured through controlling switching the switches 31 and 32.

The vehicle on-board charging inlet 80 of FIG. 3A may be, for example, a Type 2 vehicle on-board charging inlet, but are not limited as such. Likewise, the charging socket 4 of FIG. 2B may be, for example, a Type 2 charging socket, but are not limited as such.

In some examples, for instance as shown in FIG. 3A, the vehicle on-board charging system 8 may comprise the vehicle on-board charging inlet 80, the second switch 32, the vehicle on-board charger 82 and the batteries 83 of the electric vehicle.

Figure 3B:
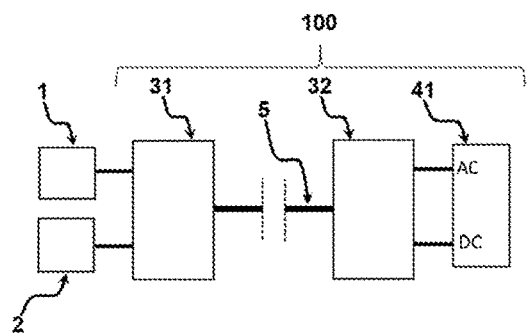
Figure 3C:
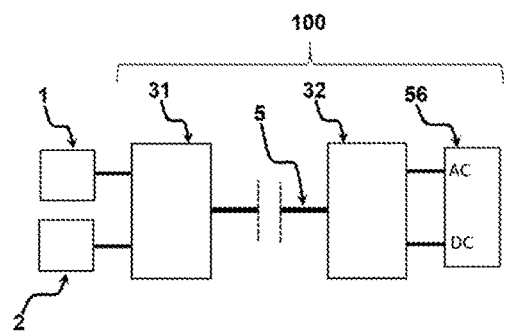

FIGS. 3B and 3C illustrate two examples of the charging apparatus 100 of FIGS. 2A and 2B for use in an electric vehicle charging system of FIG. 1A.

As illustrated in FIG. 3B, the charging apparatus 100, which is based on the charging apparatus 100 of FIGS. 2A and 2B, may further comprise a charging socket 41 comprising a plurality of AC terminals and a pair of DC terminals. The charging socket 41 may be configured to connect to the two sets of terminals of the second switch 32, for example, the first set of contacts of the second switch 32 may be configured to connect to the plurality of AC terminals of the charging socket 41, and the second set of contacts of the second switch 32 may be configured to connect to the pair of DC terminals of the charging socket 41.

The charging apparatus 100 of FIG. 3B may be used for AC charging, or DC charging, or DC and AC charging any electric vehicle configured with a vehicle on-board charging inlet (not shown) comprising a plurality of AC terminals and a pair of DC terminals through an appropriate charging connector coupling the charging socket 41 and the vehicle on-board charging inlet.

For example, the charging socket 41 may be configured as a CCS Combo 2 charging socket comprising four AC terminals (L1, L2, L3 and N) and a pair of DC terminals (+ and −), if an electric vehicle is configured with a CCS Combo 2 inlet, a CCS Combo 2 connector comprising four AC power lines (L1, L2, L3 and N) and a pair of DC power lines and corresponding plugs at the two ends may be used for AC and DC charging the electric vehicle by controlling switching the two switches 31 and 32, or a CCS Combo 2 connector comprising a pair of DC power lines and corresponding plugs at the two ends may be used for DC charging the electric vehicle by controlling switching the two switches 31 and 32, or a Type 2 connector comprising four AC power lines (L1, L2, L3 and N) or two AC power lines (L1 and N) and corresponding plugs at the two ends may be used for AC charging the electric vehicle by controlling switching the switches 31 and 32; if an electric vehicle is configured with a Type 2 inlet, a Type 2 charging cable (or connector) comprising four AC power lines (L1, L2, L3 and N) or two AC power lines (L1 and N) and corresponding plugs at the two ends may be used to connect the charging socket 4 and the vehicle on-board charging inlet (e.g. Type 2 inlet) for AC charging the electric vehicle by controlling switching the switches 31 and 32.

As illustrated in FIG. 3C, the charging apparatus 100, which is based on the charging apparatus 100 of FIGS. 2A and 2B, may further comprise a vehicle-end plug 56 comprising a plurality of AC terminals and a pair of DC terminals. The vehicle-end plug 56 may be configured to connect to the two sets of terminals of the second switch 32, for example, the first set of contacts of the second switch 32 may be configured to connect to the plurality of AC terminals of the vehicle-end plug 56, and the second set of contacts of the second switch 32 may be configured to connect to the pair of DC terminals of the vehicle-end plug 56.

The charging apparatus 100 of FIG. 3C may be used for AC and DC charging any electric vehicle configured with a vehicle on-board charging inlet (not shown) comprising a plurality of AC terminals and a pair of DC terminals.

For example, the vehicle-end plug 56 may be configured as a CCS Combo 2 plug comprising four AC terminals (L1, L2, L3 and N) and a pair of DC terminals (+ and −), if an electric vehicle is configured with a CCS Combo 2 inlet, the charging apparatus 100 of FIG. 3C may be used for AC and DC charging of the electric vehicle by controlling switching the switches 31 and 32.

It will be appreciated that the charging cable 5 in FIGS. 3B and 3C may be a long charging cable, for example 50m long but not limited as such, and the second switch 32 and the charging socket 41 or the vehicle-end plug 56 may be configured to be located in a charging post or charging station, which may be away from the AC charging circuit 1 and the DC charging circuit 2.

In examples where the first switch 31 and the second switch 32 are configured to be in a back-to-back form, it will be appreciated that the back-to-back switches 31 and 32 for the charging apparatus 100 in FIGS. 3B and 3C may reduce the number of power lines of the charging cable 5. If the charging cable 5 is short, for example 3 to 4 m long but not limited as such, the switches 31 and 32 may be configured to form an interlock switch (e.g. rather than two individual switches, not shown). The interlock switch may be configured to interlock the connections between the AC charging circuit 1 to the plurality of AC terminals of the charging socket 41 or the vehicle-end plug 56, and the DC charging circuit 2 to the pair of DC terminals of the charging socket 41 or the vehicle-end plug 56. In other words, only one of the two connections between the AC charging circuit 1 to the plurality of AC terminals of the charging socket 41 or the vehicle-end plug 56 and the DC charging circuit 2 to the DC terminals of the charging socket 41 or the vehicle-end plug 56 may be configured to be switched on at any time.

Figure 3D:
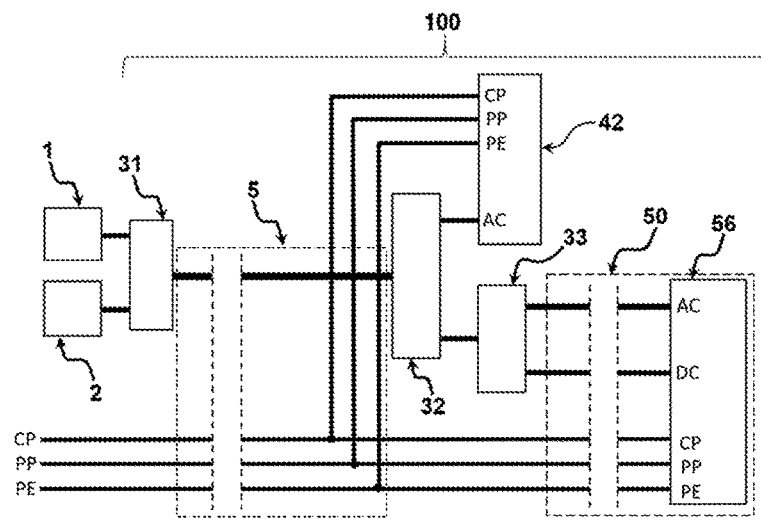

FIG. 3D illustrates another example of the charging apparatus 100 of FIGS. 2A and 2B for use in an electric vehicle charging system of FIG. 1A, and the charging apparatus 100 does not involve a vehicle on-board charging system.

As illustrated in FIG. 3D, based on the charging apparatus 100 of FIGS. 2A and 2B, the charging apparatus 100 may further comprise a charging socket 42 comprising a plurality of AC terminals, a third switch 33, and a charging connector 50 comprising a plurality of AC power lines and a pair of DC power lines and a vehicle-end plug 56. The vehicle-end plug 56 may comprise a plurality of AC terminals corresponding to the plurality of AC power lines of the charging connector 50 and a pair of DC terminals corresponding to the pair of DC power lines of the charging connector 50. The first set of contacts of the second switch 32 may be configured to connect to the plurality of AC terminals of the charging socket 42.

Like the first switch 31 and the second switch 32 of FIGS. 2A and 2B, the third switch 33 in FIG. 3D may comprise a plurality of poles and a plurality of sets of contacts. The plurality of poles may be configured to connect to the second set of contacts of the second switch 32. The first set of contacts of the third switch 33 may be configured to connect to the plurality of AC terminals of the vehicle-end plug 56, and the second set of contacts of the third switch 33 may be configured to connect to the pair of DC terminals of the vehicle-end plug 56.

As illustrated in FIG. 3D, the first switch 31 may be configured to switch the connections between the AC charging circuit 1 and the DC charging circuit 2 to the plurality of power lines of the charging cable 5, the second switch 32 may be configured to switch the connections between the plurality of AC terminals of the charging socket 42 and the plurality of poles of the third switch 33 to the plurality of power lines of the charging cable 5, and the third switch 33 may be configured to switch the connections between the plurality of AC terminals and the DC terminals of the vehicle-end plug 56 to the plurality of poles of the third switch 33.

The charging apparatus 100 of FIG. 3D may be used for AC charging, or DC charging, or DC and AC charging any electric vehicle configured with a vehicle on-board charging inlet (not shown) comprising a plurality of AC terminals and a pair of DC terminals, or a plurality of AC terminals, through plugging the vehicle-end plug 56 into the vehicle on-board charging inlet or an appropriate charging connector coupling the charging socket 42 and the vehicle on-board charging inlet.

For example, the charging socket 42 may be configured as a Type 2 charging socket comprising four AC terminals (L1, L2, L3 and N) or two AC terminals (L1 and N), the vehicle-end plug 56 may be configured as a CCS Combo 2 plug comprising four AC terminals (L1, L2, L3 and N) or two AC terminals (L1 and N) and a pair of DC terminals (+ and −), but are not limited as such. When an electric vehicle is configured with a CCS Combo 2 inlet, the vehicle-end plug 56 (e.g. CCS Combo 2 plug) may be plugged into the vehicle on-board charging inlet (e.g. CCS Combo 2 inlet), the charging apparatus 100 may be used for AC and DC charging the electric vehicle by controlling switching the three switches 31, 32 and 33. When an electric vehicle is configured with a Type 2 inlet, a Type 2 charging cable comprising four AC power lines or two AC power lines and corresponding plugs may be used to couple the charging socket 42 (e.g. Type 2 socket) and the vehicle on-board charging inlet (e.g. Type 2 inlet) for AC charging the electric vehicle by controlling switching the two switches 31 and 32.

As illustrated in FIG. 3D, there may be three possible connections. The first one is the connection between the AC charging circuit 1 to the AC terminals of the charging socket 42. The connection may be configured for AC charging the batteries (not shown) of an electric vehicle through the vehicle on-board charger (not shown) if the electric vehicle is connected to the charging socket 42 through a suitable charging connector, for example a Type 2 connector but not limited as such. The connection may be configured by connecting the AC charging circuit 1 to the plurality of power lines of the charging cable 5 through the first switch 31, and connecting the plurality of power lines of the charging cable 5 to the AC terminals of the charging socket 42 through the second switch 32.

The second possible connection is the connection between the AC charging circuit 1 to the AC terminals of the vehicle-end plug 56. The connection may be configured for AC charging the batteries of an electric vehicle if the vehicle-end plug 56 is plugged into the vehicle on-board charging inlet, for example a CCS Combo 2 inlet but not limited as such, of the electric vehicle. The connection may be configured by connecting the AC charging circuit 1 to the plurality of power lines of the charging cable 5 through the first switch 31, connecting the plurality of power lines of the charging cable 5 to the plurality of poles of the third switch 33 through the second switch 32, and connecting the plurality of poles of the third switch 33 to the plurality of AC terminals of the vehicle-end plug 56 through the third switch 33.

The third possible connection is the connection between the DC charging circuit 2 to the DC terminals of the vehicle-end plug 56. The connection may be configured for DC charging the batteries of an electric vehicle if the vehicle-end plug 56 is plugged into the vehicle on-board charging inlet, for example a CCS Combo 2 inlet but not limited as such, of the electric vehicle. The connection may be configured by connecting the DC charging circuit 2 to the plurality of power lines of the charging cable 5 through the first switch 31, connecting the plurality of power lines of the charging cable 5 to the plurality of poles of the third switch 33 through the second switch 32, and connecting the plurality of poles of the third switch 33 to the DC terminals of the vehicle-end plug 56 through the third switch 33.

Any other connections apart from these three connections are considered to be invalid in this system. For the safe operation of the charging apparatus 100 of FIG. 3D, the associated control apparatus must ensure that any other connections are avoided.

The charging apparatus 100 of FIG. 3D may further comprise a charging socket cap (not shown) configured to cover the charging socket 42, a plug pocket (not shown) configured to house the vehicle-end plug 56 and an interlock mechanism (not shown). The interlock mechanism may be configured to interlock the charging socket cap and the plug pocket to prevent the charging socket cap being opened and the vehicle-end plug 56 being removed from the plug pocket at the same time. In other words, the interlock mechanism may be configured to ensure that only either the charging socket 42 or the vehicle-end plug 56 (e.g. the charging cable 5) may be used for charging or discharging an electric vehicle at any one time.

It will be appreciated that there are many different methods to configure the charging socket cap with a locking mechanism to secure covering the charging socket 42 and any suitable method may be used. There are many different methods to configure the plug pocket with a locking mechanism to secure housing the vehicle-end plug 56 of FIG. 3D and any suitable method may be used. There are many different types of interlocking mechanisms to interlock the charging socket cap and the plug pocket and any suitable type may be used.

It will be appreciated that the plurality of power lines of the charging cable 5 in FIGS. 2A, 2B, and 3A to 3D, the charging socket 4 and the charger-end plug 51 in FIG. 2B, and the vehicle-end plug 55 and the vehicle on-board charging inlet 80 in FIG. 3A cannot transfer AC power and DC power together (e.g. simultaneously) at any time. For example, both the first switch 31 and the second switch 32 may be configured to switch to the first position (e.g. to move the plurality of poles to the first set of contacts of the two switches) or the second position (e.g. to move the plurality of poles to the second set of contacts of the two switches) for the safe operation of the charging apparatus 100 and the electric vehicle charging system in FIGS. 3A to 3C, however the first switch 31 and the second switch 32 must not be switched to different positions between the first position and the second position. A control apparatus (not shown) may be configured to control the switching operation of the first switch 31 and the second switch 32 and ensure safe operation of the charging apparatus 100 and the electric vehicle charging system.

FIGS. 4A to 4E illustrate examples of the switches 31, 32 and 33 in FIGS. 2A, 2B, and 3A to 3D.

As illustrated in FIGS. 2A, 2B, and 3A to 3D, the switch (e.g. switch 31 or 32 or 33) may comprise a plurality of poles and a plurality of sets of contacts. The switch may be configured to move the plurality of poles between a first position, where the plurality of poles is connected to the first set of contacts of the switch, and a second position, where the plurality of poles is not connected to the first set of contacts of the switch.

Figure 4A:
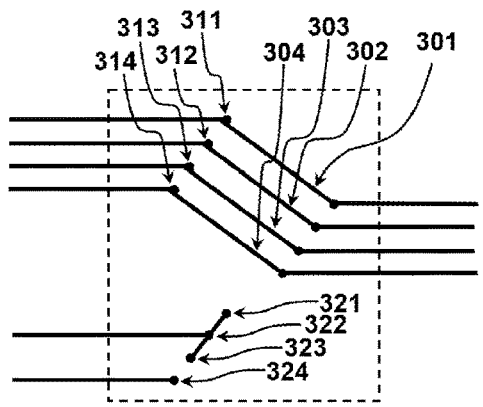
FIGS. 4A to 4E illustrate examples of switch which may be used in the charging apparatus of FIGS. 2A, 2B, and 3A to 3D.
Figure 4B:
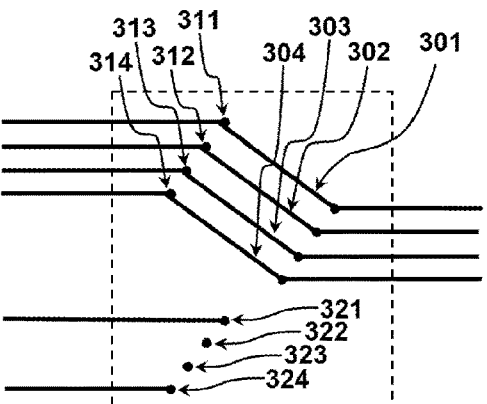
Figure 4C:
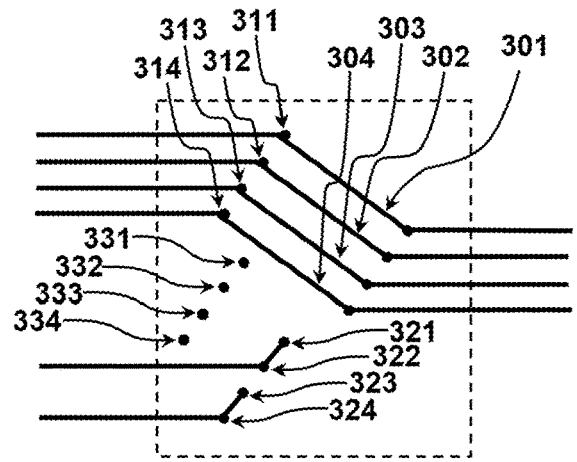
Figure 4D:
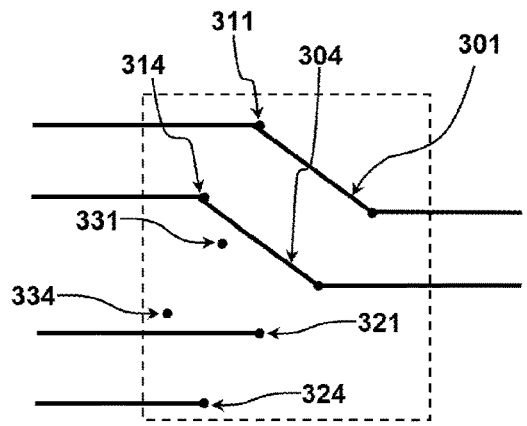
Figure 4E:
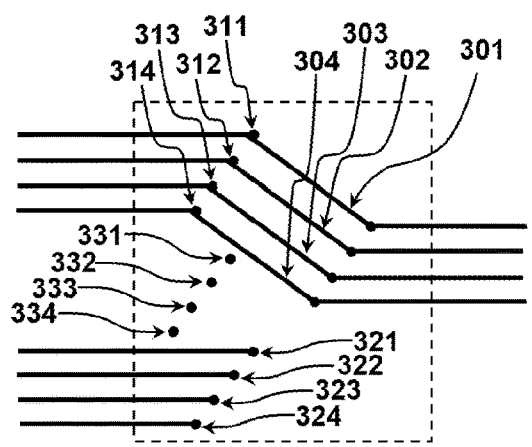

As illustrated in FIGS. 4A, 4B, 4C and 4E, the switch (e.g. switch 31 or 32 or 33) may comprise four poles (301 to 304) (e.g. a four-pole switch) and two sets of four contacts (311 to 314) and (321 to 324) (as in FIGS. 4A and 4B) or three sets of four contacts (311 to 314), (321 to 324) and (331 to 334) (as in FIGS. 4C and 4E). The switch may be configured to move the four poles (301 to 304) between a first position (e.g. for a first connection) where the four poles (301 to 304) are connected to the first set of four contacts (311 to 314) of the switch, and a second position where the four poles (301 to 304) are not connected to the first set of four contacts (311 to 314) of the switch. In other words, the four poles (301 to 304) may be moved to connect to the second set of four contacts (321 to 324) of the switch or the third set of four isolated contacts (331 to 334) (as in FIGS. 4C and 4E) of the switch.

As illustrated in FIG. 4D, the switch (e.g. switch 31 or 32 or 33) may comprise two poles (301 and 304) (e.g. a two-pole switch) and three sets of two contacts (311 and 314), (321 and 324) and (331 and 334) or two sets of two contacts (311 and 314) and (321 and 324) (not shown). The switch may be configured to move the two poles (301 and 304) between a first position (e.g. for a first connection) where the two poles (301 and 304) are connected to the first set of two contacts (311 and 314) of the switch, and a second position where the two poles (301 and 304) are not connected to the first set of two contacts (311 and 314) of the switch. In other words, the two poles (301 and 304) may be moved to connect to the second set of two contacts (321 and 324) of the switch or the third set of two isolated contacts (331 and 334) of the switch.

It will be appreciated that the two-pole switch can be used only in charging apparatus 100 of FIGS. 2A, 2B, and 3A to 3D when the AC charging circuit 1 is a single-phase AC charger.

For a four-pole switch, any two or three of the contacts of the second set of four contacts may be electrically connected to one another, for example, the three contacts (321, 322 and 323) of the second set of four contacts (321 to 324) may be configured to be electrically connected to one another (as in FIG. 4A), or the two contacts (321 and 322) of the second set of four contacts (321 to 324) may be configured to be electrically connected to one another and the other two contacts (323 and 324) of the second set of four contacts (321 to 324) may be also configured to be electrically connected to one another (as in FIG. 4C), but are not limited as such.

The second set of four contacts (321 to 324) may be configured to form a pair of terminals for DC power transfer, for example, the electrically connected three contacts (321, 322 and 323) may be configured to form a DC positive terminal and the other contact 324 may be configured to form a DC negative terminal (as in FIG. 4A), or the two electrically connected contacts (321 and 322) may be configured to form a DC positive terminal and the other two electrically connected contacts (323 and 324) may be configured to form a DC negative terminal (as in FIG. 4C), but are not limited as such.

Alternatively, any two of the four contacts (321 to 324), for example contacts 321 and 324 (as in FIG. 4B) but not limited as such, may be configured to form a pair of DC terminals, or any two electrically connected contacts and any one of the other two not-electrically connected contacts (not shown) may be configured to form a pair of DC terminals.

It will be appreciated that the electrically connected contacts (as in FIGS. 4A and 4C) may be configured to reduce the diameter and hence cost of the corresponding power lines of the charging cable 5, and therefore the switch configurations of FIGS. 4A and 4C have advantages over the switch configuration of FIG. 4B.

As illustrated in FIGS. 4C to 4E, the switch (e.g. switch 31 or 32 or 33) may be configured to move the plurality of poles (301 to 304 as in FIGS. 4C and 4E) or (301 and 304 as in FIG. 4D) to connect to the third set of contacts (e.g. contacts 331 to 334 as in FIGS. 4C and 4E or contacts 331 and 334 as in FIG. 4D), which are configured to be isolated contacts. When the plurality of poles is moved to the third set of contacts, the connection through the switch is isolated. This configuration will reinforce the safety of the charging apparatus 100 and the electric vehicle charging system.

As illustrated in FIG. 4E, the four-pole switch may comprise a full set of four terminals connected to the second set of four contacts (321 to 324). Therefore, the first set of contacts (311 to 314) and the second set of contacts (321 to 324) may be configured exactly the same. This four-pole switch configuration may be used for the second switch 32 in FIG. 3D.

It will be appreciated that a protective earthing system PE for the charging apparatus 100 of FIGS. 2A, 2B, and 3A to 3D may be configured for charging and discharging the batteries of the electric vehicle and the protective earthing system PE of the charging apparatus 100 may be configured to be shared with the vehicle on-board charging system, such as illustrated in FIG. 3D. For example, the charging cable 5 may comprise a protective earthing line PE and each vehicle on-board charging inlet or charging socket or plug in the charging apparatus 100 may comprise a protective earthing terminal PE, but not limited as such.

It will be appreciated that a communication system between the charging apparatus 100 of FIGS. 2A, 2B, and 3A to 3D and the vehicle on-board charging system 8 may be configured for charging and discharging the batteries of the electric vehicle. FIG. 3D illustrates an example of the communication system comprising signal lines/terminals "PP" and "CP" between the charging apparatus 100 and the vehicle on-board charging system 8 (e.g. between the controller or control apparatus of the charging apparatus 100 and the charging controller or control apparatus of the vehicle on-board charging system 8). Each charging cable or connector and each vehicle on-board charging inlet or charging socket or plug in the charging apparatus 100 may comprise a plurality of communication signal lines/terminals, for example, the communication signal "PP" and "CP" lines/terminals in FIG. 3D, but not limited as such.

It will be appreciated that there are other ways to implement the communication between the charging apparatus 100 and the vehicle on-board charging system 8 for charging and discharging the batteries of the electric vehicle, for example, wireless communication, but not limited as such.

It will be appreciated that there are several types of switches which may be used, for example, mechanical and electronic switches, but not limited as such, and several variations which may be used, for example, switching the live and/or positive terminals only, but not limited as such, to configure the switches 31 and 32 and 33 to implement the features of the switches 31 and 32 and 33 described in this specification. It will also be appreciated that any suitable type of switch and any suitable switching configuration may be used for the switches 31, 32 and 33 in FIGS. 2A, 2B, and 3A to 3D.

The charging apparatus 100 of FIGS. 2A, 2B, and 3A to 3D may comprise a control apparatus configured to electronically control the operations of the charging apparatus 100.

The charging apparatus 100 may comprise a central controller and/or controllers configured to control the operation and monitor the performance of the charging apparatus 100 and electric vehicle charging system. For example, the central controller may be configured to communicate with the other controllers in the electric vehicle charging system, for example, the controller of the charging apparatus 100 of FIGS. 3A to 3D and the controller of the vehicle on-board charging system of FIG. 3D, but not limited as such, to control the overall operation of the whole electric vehicle charging system, to monitor the fault current (or short circuit current) at various locations through signals received from embedded sensors and/or transducers.

It will be appreciated that the electronic control operations described herein may be controlled from any appropriate location and performed by any type of suitable control apparatus or combination of control apparatuses. There is no specific limitation to the dedicated central controller and/or controllers arrangement described above.

The various operations performed by the control apparatus of the charging apparatus 100 of FIGS. 2A, 2B, and 3A to 3D will now be described in more detail with reference to FIGS. 5A to 5G.

Figure 5A:
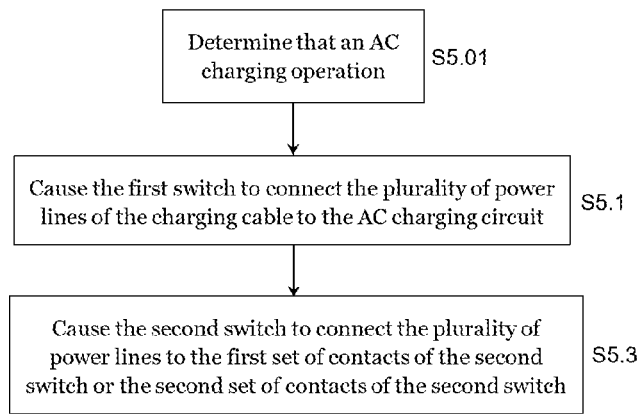
FIGS. 5A to 5G illustrate examples of various operations that may be performed by control apparatus of charging apparatus for use in an electric vehicle charging system.

As illustrated by FIG. 5A, for the charging apparatus 100 of FIGS. 2A and 2B, the control apparatus may be configured to determine to provide an AC charging operation (S5.01). The control apparatus may be configured to then control the first switch 31 to connect the plurality of poles of the first switch 31 (e.g. the plurality of power lines of the charging cable 5) to the first set of contacts of the first switch 31 (e.g. the AC charging circuit 1) (S5.1), and the second switch 32 to connect the plurality of poles of the second switch 32 (e.g. the plurality of power lines of the charging cable 5) to the first set of contacts of the second switch 32 or the second set of contacts of the second switch 32 (S5.3), depending on applications. In this way, the AC charging operation as described above may be caused by control signals sent by the control apparatus.

The control apparatus may be configured to determine an AC charging operation based on at least one of: detected unavailability of the DC power source (not shown), detected low grid electricity tariff, and detected requesting signal for an AC charging operation. For example, if the control apparatus receives signals indicating that electricity (e.g. power) is unavailable from the DC power source (not shown), such as solar photovoltaic panels or storage batteries, or the electricity tariff from the AC power source (not shown) is low, the control apparatus may determine and cause an AC charging operation.

Figure 5B:
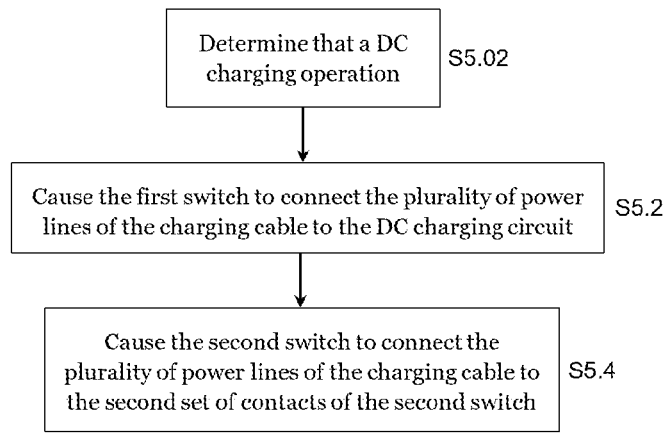

As illustrated by FIG. 5B, for the charging apparatus 100 of FIGS. 2A and 2B, the control apparatus may be configured to determine to provide a DC charging operation (S5.02). The control apparatus may be configured to then control the first switch 31 to connect the plurality of poles of the first switch 31 (e.g. the plurality of power lines of the charging cable 5) to the second set of contacts of the first switch 31 (e.g. the DC charging circuit 2) (S5.2), and the second switch 32 to connect the plurality of poles of the second switch 32 (e.g. the plurality of power lines of the charging cable 5) to the second set of contacts of the second switch 32 (S5.4). In this way, the DC charging operation as described above may be caused by control signals sent by the control apparatus.

The control apparatus may be configured to determine a DC charging operation based on at least one of: detected availability of the DC power source (not shown), detected high grid electricity tariff (e.g. electricity price from the AC power source, not shown), and detected requesting signal for a DC charging operation. For example, if the control apparatus receives signals indicating that electricity (e.g. power) is available from the DC power source (not shown), such as solar photovoltaic panels or storage batteries, and the electricity tariff from the AC power source (not shown) is high, the control apparatus may determine and cause a DC charging operation.

It will be appreciated that, prior to the steps shown in FIGS. 5A and 5B, the control apparatus may be configured to determine whether to provide an AC charging operation or a DC charging operation. In response to the determination that an AC charging operation should be provided, the control apparatus may be configured to perform the method as shown in FIG. 5A. In response to the determination that a DC charging operation should be provided, the control apparatus may be configured to perform the method as shown in FIG. 5B.

Figure 5C:
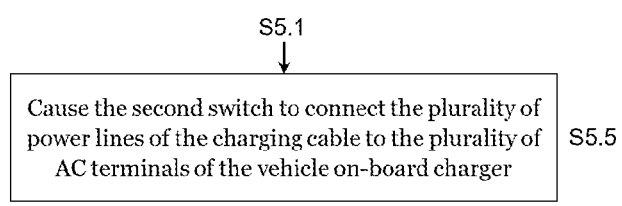

As illustrated by FIG. 5C, for the charging apparatus 100 of FIG. 3A, the control apparatus may be configured to determine to provide an AC charging operation (S5.01). The control apparatus may be configured to then control the first switch 31 to connect the plurality of power lines of the charging cable 5 to the AC charging circuit 1 (S5.1), and the second switch 32 to connect the plurality of poles of the second switch 32 (e.g. the plurality of power lines of the charging cable 5) to the first set of contacts of the second switch 32 (e.g. the vehicle on-board charger 82) (S5.5). In other words, the control apparatus may be configured to control the first switch 31 and the second switch 32 to connect the vehicle on-board charger 82 to the AC charging circuit 1. In this way, the AC charging operation as described above may be caused by control signals sent by the control apparatus.

Figure 5D:
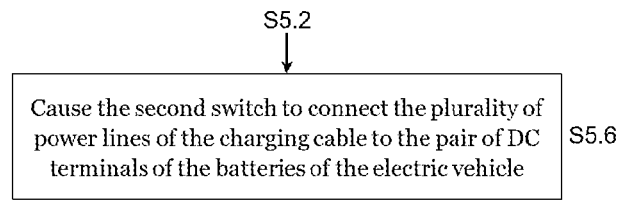

As illustrated by FIG. 5D, for the charging apparatus 100 of FIG. 3A, the control apparatus may be configured to determine to provide a DC charging operation (S5.02). The control apparatus may be configured to then control the first switch 31 to connect the plurality of power lines of the charging cable 5 to the DC charging circuit 2 (S5.2), and the second switch 32 to connect the plurality of poles of the second switch 32 (e.g. the plurality of power lines of the charging cable 5) to the second set of contacts of the second switch 32 (e.g. the pair of DC terminals of the batteries 83 of the electric vehicle) (S5.6). In other words, the control apparatus may be configured to control the first switch 31 and the second switch 32 to connect the batteries 83 of the electric vehicle to the DC charging circuit 2. In this way, the DC charging operation as described above may be caused by control signals sent by the control apparatus.

For the charging apparatus 100 of FIGS. 3B and 3C, like the control apparatus for the charging apparatus 100 of FIG. 3A, when an AC charging operation is determined, the control apparatus may be configured to control the first switch 31 and the second switch 32 to connect the plurality of AC terminals of the charging socket 4 or the vehicle-end plug 56 of the charging cable 5 to the AC charging circuit 1. When a DC charging operation is determined, the control apparatus may be configured to then control the first switch 31 and the second switch 32 to connect the pair of DC terminals of the charging socket 4 or the vehicle-end plug 56 of the charging cable 5 to the DC charging circuit 2.

Figure 5E:
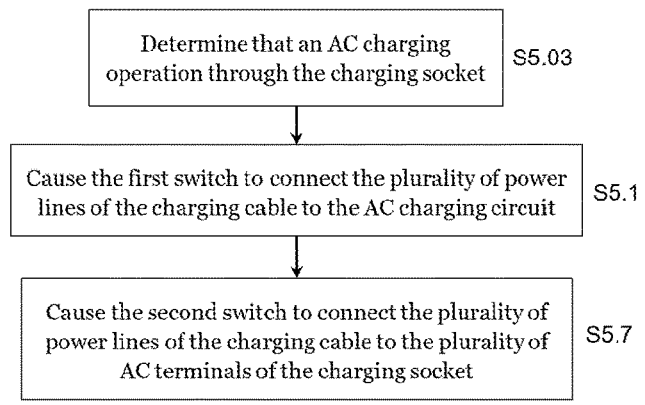

As illustrated by FIG. 5E, for the charging apparatus 100 of FIG. 3D, the control apparatus may be configured to determine to provide an AC charging operation through the plurality of AC terminals of the charging socket 42 (S5.03). The control apparatus may be configured to then control the first switch 31 to connect the plurality of poles of the second switch 32 (e.g. the plurality of power lines of the charging cable 5) to the AC charging circuit 1 (S5.1), and the second switch 32 to connect the plurality of power lines of the charging cable 5 to the first set of contacts of the second switch 32 (e.g. the plurality of AC terminals of the charging socket 42) (S5.7). In other words, the control apparatus may be configured to control the first switch 31 and the second switch 32 to connect the plurality of AC terminals of the charging socket 42 to the AC charging circuit 1.

Figure 5F:
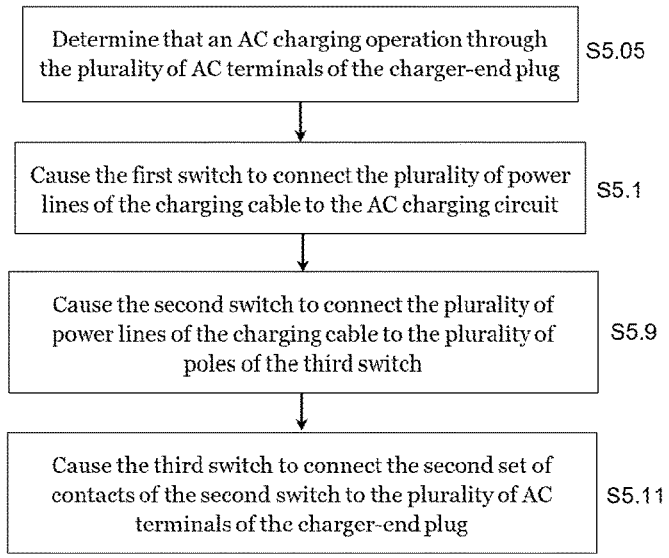

As illustrated by FIG. 5F, for the charging apparatus 100 of FIG. 3D, the control apparatus may be configured to determine to provide an AC charging operation through the plurality of AC terminals of the vehicle-end plug 56 (S5.05). The control apparatus may be configured to then control the first switch 31 to connect the plurality of power lines of the charging cable 5 to the AC charging circuit 1 (S5.1), and the second switch 32 to connect the plurality of power lines of the charging cable 5 to the second set of contacts of the second switch 32 (e.g. the plurality of poles of the third switch 33) (S5.9), and the third switch 33 to connect the second set of contacts of the second switch 32 (e.g. the plurality of poles of the third switch 33) to the first set of contacts of the third switch 33 (e.g. the plurality of AC terminals of the vehicle-end plug 56) (S5.11). In other words, the control apparatus may be configured to control the first switch 31, the second switch 32 and the third switch 33 to connect the plurality of AC terminals of the vehicle-end plug 56 to the AC charging circuit 1.

Figure 5G:
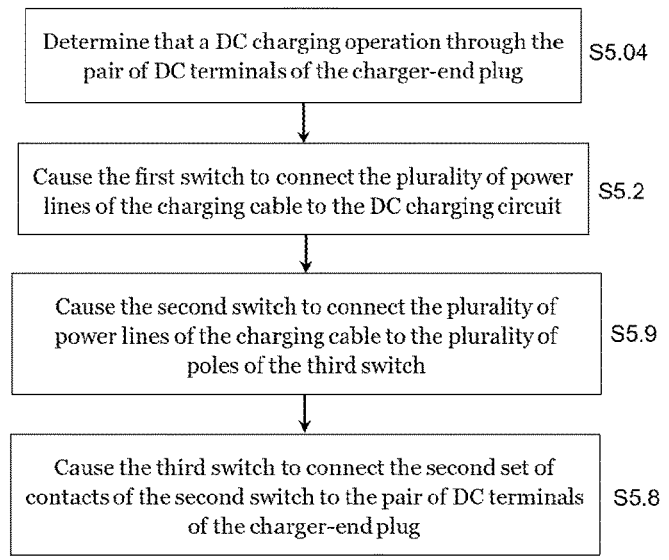

As illustrated by FIG. 5G, for the charging apparatus 100 of FIG. 3D, the control apparatus may be configured to determine to provide a DC charging operation through the pair of DC terminals of the vehicle-end plug 56 (S5.04). The control apparatus may be configured to then control the first switch 31 to connect the plurality of power lines of the charging cable 5 to the DC charging circuit 2 (S5.2), and the second switch 32 to connect the plurality of power lines of the charging cable 5 to the plurality of poles of the third switch 33 (S5.9) and the third switch 33 to connect the second set of contacts of the second switch 32 to the second set of contacts of the third switch 33 (e.g. the pair of DC terminals of the vehicle-end plug 56) (S5.8). In other words, the control apparatus may be configured to control the first switch 31, the second switch 32 and the third switch 33 to connect the pair of DC terminals of the vehicle-end plug 56 to the DC charging circuit 2.

The control apparatus may be configured to continuously control the DC charging power to the batteries of the electric vehicles through a control algorithm which may be configured to optimise the power flow profile (e.g. charging power vs charging time) to the batteries of electric vehicle based at least in part on the availability of the DC power source and the user's instructions. For example, the control algorithm may be configured to optimise the power flow profile to the batteries electric vehicle based on the availability of the DC power source, such as solar photovoltaic power or storage batteries, when the electricity tariff from the AC power source is high. In this way, the DC charging operation as described above may be configured to maximise the benefits to the user of the electric vehicle charging system. The control algorithm may be configured to follow the user's instructions, for example, the user may request fast DC charging, which may be configured to overwrite the optimised control algorithm.

It will be appreciated that there are many control algorithms and optimisation objectives which may be configured for use in the control apparatus or combination of control apparatuses. There is no specific limitation to the dedicated controller/central controller arrangement described above.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A charging apparatus for use in an electric vehicle charging system which comprises an AC power source a DC power source, and a vehicle on-board charger connected to batteries of the electric vehicle, the charging apparatus comprising:
 a first switch;
 a second switch; and
 a charging cable comprising a plurality of power lines,
 wherein each of the first switch and the second switch comprises a plurality of poles and a plurality of sets of contacts, wherein the plurality of poles corresponds to the plurality of power lines of the charging cable,
 wherein the first switch is configured to move the plurality of poles of the first switch between a first position wherein the plurality of power lines of the charging cable is connected to a first set of contacts of the first switch connected to the AC power source, and a second position wherein the plurality of power lines of the charging cable is not connected to the first set of contacts of the first switch connected to the AC power source,
 wherein the second switch is configured to move the plurality of poles of the second switch between a first position wherein the plurality of power lines of the charging cable is connected to a first set of contacts of the second switch, and a second position wherein the plurality of power lines of the charging cable is not connected to the first set of contacts of the second switch, and
 wherein, when each of the first switch and the second switch are in the second position, the plurality of power lines of the charging cable is connected to a second set of contacts of the first switch connected to the DC power source, and the plurality of power lines of the charging cable is connected to a second set of contacts of the second switch.

2. The charging apparatus of claim 1, wherein the second switch further comprises a DC charging circuit, wherein the second switch is configured to connect the DC charging circuit to the plurality of poles of the first switch.

3. The charging apparatus of claim 1, further comprising a charging socket comprising a plurality of terminals, and wherein
the plurality of terminals of the charging socket is configured to connect to the plurality of poles of the first switch, and
the charging cable further comprises a charger-end plug comprising a plurality of terminals, wherein
the plurality of terminals of the charger-end plug corresponds to the plurality of power lines of the charging cable, and
the charger-end plug of the charging cable is configured to plug into the charging socket.

4. The charging apparatus of claim 1, further comprising a vehicle on-board charging inlet comprising a plurality of terminals, and
wherein
the plurality of terminals of the vehicle on-board charging inlet is configured to connect to the plurality of poles of the second switch,
the first set of contacts of the second switch is configured to connect to the vehicle on-board charger,
the second set of contacts of the second switch is configured to connect to the batteries of the electrical vehicle, and
the charging cable further comprises a vehicle-end plug comprising a plurality of terminals, wherein
the plurality of terminals of the vehicle-end plug corresponds to the plurality of power lines of the charging cable, and
the vehicle-end plug of the charging cable is configured to plug into the vehicle on-board charging inlet.

5. The charging apparatus of claim 1, further comprising a charging socket comprising a plurality of AC terminals and a pair of DC terminals, and
wherein
the first set of contacts of the second switch is configured to connect to the plurality of AC terminals of the charging socket, and
the second set of contacts of the second switch is configured to connect to the pair of DC terminals of the charging socket.

6. The charging apparatus of claim 1, wherein
the charging cable further comprises a vehicle-end plug, wherein the vehicle-end plug comprises a plurality of AC terminals and a pair of DC terminals,
the first set of contacts of the second switch is configured to connect to the plurality of AC terminals of the vehicle-end plug of the charging cable, and
the second set of contacts of the second switch is configured to connect to the pair of DC terminals of the vehicle-end plug of the charging cable.

7. The charging apparatus of claim 1, further comprising a charging socket comprising a plurality of AC terminals; a third switch; and
a charging connector comprising a plurality of AC power lines and a pair of DC power lines and a vehicle-end plug, wherein the vehicle-end plug comprises a plurality of AC terminals corresponding to the plurality of AC power lines and a pair of DC terminals corresponding to the pair of DC power lines, and
wherein
the first set of contacts of the second switch is configured to connect to the plurality of AC terminals of the charging socket,
the third switch comprises a plurality of poles and a plurality of sets of contacts, wherein the plurality of poles is configured to connect to the second set of contacts of the second switch, and
the third switch is configured to move the plurality of poles of the third switch between a first position wherein the plurality of AC power lines of the charging connector is connected to a first set of contacts of the third switch, and a second position wherein the plurality of AC power lines of the charging connector is not connected to the first set of contacts of the third switch.

8. The charging apparatus of claim 7, wherein in the second position,
the pair of DC power lines of the charging connector is connected to a second set of contacts of the third switch.

9. The charging apparatus of claim 1, wherein:
at least two of the contacts of the second set of contacts of at least one of the first and second switches are electrically connected to one another and also to one of a DC positive terminal or a DC negative terminal.

10. The charging apparatus of claim 9, wherein
at least one of the first and second switches further comprises a third set of contacts, the third set of contacts being isolated, and
the at least one switch is further configured to move the plurality of poles of the respective switch to a third position wherein a plurality of terminals is connected to the third set of contacts.

11. A method of controlling a charging apparatus for use in an electric vehicle charging system which comprises an AC power source, a DC power source, and a vehicle on-board charger connected to batteries of the electric vehicle, the charging apparatus comprising a charging cable which comprises a plurality of power lines, a first switch and a second switch, each of the first and second switches comprises a plurality of poles corresponding to the plurality of power lines of the charging cable, and a plurality of sets of contacts, the first switch is configured to selectively connect the plurality of power lines of the charging cable to one of: the AC power source, and the DC power source, and the second switch is configured to selectively connect the plurality of power lines of the charging cable to one of: a first set of contacts of the second switch, and a second set of contacts of the second switch, the method comprising:
determining whether to provide an AC charging operation or a DC charging operation,
in response to determining that an AC charging operation should be provided, controlling the first switch to connect the plurality of power lines of the charging cable to the AC power source, and the second switch to connect the plurality of power lines of the charging cable to the first set of contacts of the second switch or the second set of contacts of the second switch; and
in response to determining that a DC charging operation should be provided, controlling the first switch to connect the plurality of power lines of the charging cable to the DC power source, and the second switch to connect the plurality of power lines of the charging cable to the second set of contacts of the second switch.

12. The method of claim 11, wherein the charging apparatus further comprises a vehicle on-board charging inlet comprising a plurality of terminals, and the charging cable further comprises a vehicle-end plug comprising a plurality of terminals plugged into the vehicle on-board charging inlet connected to the plurality of poles of the second switch, the first set of contacts of the second switch is connected to the vehicle on-board charger, and the second set of contacts of the second switch is connected to the batteries of the electrical vehicle, the method further comprising:

in response to determining that an AC charging operation should be provided, controlling the first switch and the second switch to connect the vehicle on-board charger to the AC power source; and in response to determining that a DC charging operation should be provided, controlling the first switch and the second switch to connect the batteries of the electrical vehicle to the DC power source.

13. The method of claim 11, wherein:

the charging apparatus further comprises a charging socket comprising a plurality of AC terminals and a pair of DC terminals, or the charging cable further comprises a vehicle-end plug comprising a plurality of AC terminals and a pair of DC terminals, wherein the first set of contacts of the second switch connects to the plurality of AC terminals of the charging socket or the vehicle-end plug of the charging cable, and the second set of contacts of the second switch is configured to connect to the pair of DC terminals of the charging socket or the vehicle-end plug of the charging cable, the method further comprising:

in response to determining that an AC charging operation should be provided, controlling the first switch and the second switch to connect the plurality of AC terminals of the charging socket or the vehicle-end plug of the charging cable to the AC power source; and in response to determining that a DC charging operation should be provided, controlling the first switch and the second switch to connect the pair of DC terminals of the charging socket or the vehicle-end plug of the charging cable to the DC power source.

14. The method of claim 11, wherein the charging apparatus further comprises a charging socket comprising a plurality of AC terminals, a third switch comprising a plurality of poles, which is connected to the second set of contacts of the second switch, and a plurality of sets of contacts, and a charging connector comprising a vehicle-end plug, which comprises a plurality of AC terminals and a pair of DC terminals, the first set of contacts of the second switch is connected to the plurality of AC terminals of the charging socket, the third switch selectively connects the second set of contacts of the second switch to one of: the plurality of AC terminals of the vehicle-end plug, and the pair of DC terminals of the vehicle-end plug, the method comprising:

determining whether to provide an AC charging operation through the plurality of AC terminals of the charging socket or the plurality of AC terminals of the vehicle-end plug, or a DC charging operation through the pair of DC terminals of the vehicle-end plug;

in response to determining that an AC charging operation should be provided through the plurality of AC terminals of the charging socket, controlling the first switch and the second switch to connect the plurality of AC terminals of the charging socket to the AC power source;

in response to determining that an AC charging operation should be provided through the plurality of AC terminals of the vehicle-end plug, controlling the first switch, the second switch and the third switch to connect the plurality of AC terminals of the vehicle-end plug to the AC power source; and in response to determining that a DC charging operation should be provided through the pair of DC terminals of the vehicle-end plug, controlling the first switch, the second switch and the third switch to connect the pair of DC terminals of the vehicle-end plug to the DC power source.

15. Charging apparatus for use in an electric vehicle charging system which comprises an AC power source, a DC power source, and a vehicle on-board charger connected to batteries of the electric vehicle, the the charging apparatus comprising:

a first switch;
a second switch;
a charging cable comprising a plurality of power lines; and
a control apparatus, wherein
each of the first switch and the second switch comprises a plurality of poles and a plurality of sets of contacts, wherein the plurality of poles corresponds to the plurality of power lines of the charging cable;

the first switch is configured to move the plurality of poles of the first switch between a first position wherein the plurality of power lines of the charging cable is connected to a first set of contacts of the first switch connected to the AC power source, and a second position wherein the plurality of power lines of the charging cable is not connected to the first set of contacts of the first switch connected to the AC power source;

the second switch is configured to move the plurality of poles of the second switch between a first position wherein the plurality of power lines of the charging cable is connected to a first set of contacts of the second switch, and a second position wherein the plurality of power lines of the charging cable is not connected to the first set of contacts of the second switch; and the control apparatus is configured to:
determine whether to provide an AC charging operation or a DC charging operation, in response to determining that an AC charging operation should be provided, control the first switch to connect the plurality of power lines of the charging cable to the AC power source, and the second switch to connect the plurality of power lines of the charging cable to the first set of contacts of the second switch or the second set of contacts of the second switch; and in response to determining that a DC charging operation should be provided, control the first switch to connect the plurality of power lines of the charging cable to the DC power source, and the second switch to connect the plurality of power lines of the charging cable to the second set of contacts of the second switch.

* * * * *